US011396521B2

(12) United States Patent
Lang et al.

(10) Patent No.: US 11,396,521 B2
(45) Date of Patent: Jul. 26, 2022

(54) ULTRA-THIN NI—FE-MOF NANOSHEET, PREPARATION METHOD AND USE THEREOF

(71) Applicant: SOOCHOW UNIVERSITY, Suzhou (CN)

(72) Inventors: Jianping Lang, Suzhou (CN); Feilong Li, Suzhou (CN); Xiaoqing Huang, Suzhou (CN); Chunyan Ni, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/252,711

(22) PCT Filed: Nov. 7, 2018

(86) PCT No.: PCT/CN2018/114307
§ 371 (c)(1),
(2) Date: Dec. 15, 2020

(87) PCT Pub. No.: WO2020/073398
PCT Pub. Date: Apr. 16, 2020

(65) Prior Publication Data
US 2021/0155649 A1 May 27, 2021

(30) Foreign Application Priority Data
Oct. 9, 2018 (CN) .......................... 201811173331.X (51) Int. Cl.
*C07F 15/04* (2006.01)
*C25B 11/085* (2021.01)
(Continued)

(52) U.S. Cl.
CPC ................ *C07F 15/04* (2013.01); *C25B 1/04* (2013.01); *C25B 11/02* (2013.01); *C25B 11/085* (2021.01); *B82Y 40/00* (2013.01)

(58) Field of Classification Search
None
See application file for complete search history.

(56) References Cited

FOREIGN PATENT DOCUMENTS

| CN | 103464784 A | 12/2013 |
|---|---|---|
| CN | 105732728 A | 7/2016 |

(Continued)

OTHER PUBLICATIONS

Machine-generated English translation for CN 107267124 A, 2017.*

(Continued)

*Primary Examiner* — Yun Qian
(74) *Attorney, Agent, or Firm* — SZDC Law P.C.

(57) ABSTRACT

The present invention discloses a method for preparing an ultra-thin Ni—Fe-MOF nanosheet, which comprises the steps of dissolving an organic ligand in an organic solvent, dripping the resulting solution to an aqueous solution containing a nickel salt and an iron salt, mixing uniformly and reacting at 140-160° C. for 3-6 h to obtain the ultra-thin Ni—Fe-MOF nanosheet, wherein the organic ligand is terephthalic acid and/or disodium terephthalate, and the organic solvent is N,N-dimethylacetamide and/or N,N-dimethylformamide. The present invention discloses an ultra-thin Ni—Fe-MOF nanosheet, and use thereof. The preparation method does not require a surfactant, the surface of the product is neat and easy to be cleaned, and the large-scale synthesis of 2D ultra-thin MOF materials can be realized.

3 Claims, 10 Drawing Sheets

(51) Int. Cl.
*C25B 1/04* (2021.01)
*C25B 11/02* (2021.01)
*B82Y 40/00* (2011.01)

(56) References Cited

FOREIGN PATENT DOCUMENTS

| | | |
|---|---|---|
| CN | 107267124 A | 10/2017 |
| CN | 107442125 A | 12/2017 |

OTHER PUBLICATIONS

Duan et al. Ultrathin metal-organic framework array for efficient electrocatalytic water splitting, Nature Communications, 8:15341, DOI: 10.1038/ncomms15341 (Jun. 2, 2017).

* cited by examiner

ULTRA-THIN NI—FE-MOF NANOSHEET, PREPARATION METHOD AND USE THEREOF

This application is the National Stage Application of PCT/CN2018/114307, filed on Nov. 7, 2018, which claims priority to Chinese Patent Application No. 201811173331.X, filed on Oct. 9, 2018, which is incorporated by reference for all purposes as if fully set forth herein.

FIELD OF THE INVENTION

The present invention relates to the technical field of metal-organic framework materials, and more particularly to an ultra-thin Ni—Fe-MOF nanosheet, and a preparation method and use thereof.

DESCRIPTION OF THE RELATED ART

With the excessive use of petroleum resources, the problems of energy depletion and environmental pollution have become increasingly serious, and hydrogen, as a clean energy, has attracted great attention. Efficient energy conversion and storage systems are a focus of research at present, for example, fuel cells and electrolysis of water in the electrochemical field. The production of hydrogen by electrolysis of water has theoretically high value of research. Oxygen evolution ($4OH^- \rightarrow 2H_2O+O_2+4e^-$) is an important half-reaction having slow kinetics that often limits the overall efficiency of the system. At present, most electrocatalysts are based on noble metal materials. For non-noble metals, especially nickel and iron based materials, how to improve the intrinsic activity of active sites and increase the number of active sites has become a main issue in this research direction. As a new type of porous material, metal-organic framework (MOF) materials are widely used in the separation and storage of gases, biosensors, photoelectric catalysis and other fields, due to their high specific surface area, rich and adjustable chemical structures and diverse metal sites and functional groups. Compared with traditional crystalline MOF materials, two-dimensional (2D) ultra-thin MOF materials have the advantages of exposing more active sites, and promoting material transport and electron transfer, thus having potential application value in the field of electrocatalysis. However, the limitations of the preparation method hinder its extensive and in-depth research. The main difficulty lies in how to effectively break the bond between layers while ensuring the integrity of the intra-layer structure.

At present, the strategies for preparing 2D ultra-thin MOF materials mainly include "top-down" and "bottom-up" approaches. The former mainly includes mechanical grinding and ultrasonic peeling (see Y. Peng, Y. Li, Y. Ban, H. Jin, W. Jiao, X. Liu, W. Yang, Science 2014, 346, 1356-1359; and P. Z. Li, Y. Maeda, Q. Xu, Chem. Commun. 2011, 47, 8436-8438). However, the disadvantage is that the yield of the product is low (about 15%), the uniformity is poor, and fragmentation and re-stacking often occur to the peeled nanosheets. Compared with the "top-down" strategy, the "bottom-up" wet chemical synthesis is theoretically easier to achieve the large-scale synthesis of 2D ultra-thin MOF materials. However, the traditional "bottom-up" synthesis strategy often requires the assistance of a substrate material and a surfactant (see J. Duan, S. Chen, C. Zhao, Nat. Commun. 2017, 8, 15341-15348; M. Jahan, Z. Liu, K. P. Loh, Adv. Funct. Mater. 2013, 23, 5363-5372; and M. Zhao, Y. Wang, Q. Ma, Y Huang, X. Zhang, J. Ping, Z. Zhang, Q. Lu, Y. Yu, H. Xu, Y Zhao, H. Zhang, Adv. Mater. 2015, 27, 7372-7378). It is still difficult to prepare dispersed 2D ultra-thin MOF nanosheets, and residual surfactant in the product are difficult to be removed, which greatly limits the use of such materials.

Therefore, the design of a simple and effective method that can produce high-quality, highly catalytically active 2D ultra-thin MOF materials on a large scale at a low cost is not only of great significance to its basic research in electrochemistry, but also effectively promotes the practical application of MOF materials in energy-related fields.

SUMMARY OF THE INVENTION

The technical problem to be solved by the present invention is to provide a method for preparing an ultra-thin Ni—Fe-MOF nanosheet. The preparation method does not require a surfactant, the surface of the product is neat and easy to be cleaned, and the large-scale synthesis of 2D ultra-thin MOF materials can be realized.

To solve the above technical problems, the present invention provides a method for preparing an ultra-thin Ni—Fe-MOF nanosheet, which comprises the following steps:

dissolving an organic ligand in an organic solvent to get a mixed solution;

dripping the mixed solution to an aqueous solution containing a nickel salt and an iron salt;

mixing uniformly and reacting at 140-160° C. for 3-6 h to obtain the ultra-thin Ni—Fe-MOF nanosheet, where the organic ligand is terephthalic acid and/or disodium terephthalate, and the organic solvent is N,N-dimethylacetamide (DMAC) and/or N,N-dimethyl formamide (DMF).

In the present invention, due to the different solubilities of the metal salt and the organic ligand in water and organic solvents, to obtain a uniformly mixed solution, the reactants need to be respectively completely dissolved in a solvent to prepare a corresponding solution in advance.

In the present invention, to avoid the production of a large amount of flocculent precipitate when the two solutions are mixed, an addition order of adding the organic solution with the organic ligand to the aqueous solution with the metal salt needs to be followed.

In the present invention, since obvious exotherm occurs when the two solutions are mixed, the dripping needs to be performed slowly with stirring.

Preferably, the nickel salt is nickel acetate tetrahydrate and/or nickel nitrate hexahydrate, and the iron salt is ferrous sulfate heptahydrate.

Preferably, the molar ratio of nickel ions to iron ions in the reaction solution is 5:1 to 5:2. More preferably, the molar ratio of nickel ions to iron ions in the reaction solution is 10:3.

Preferably, the concentration of iron ions in the reaction solution is 1.67 to 3.33 mmol/L. More preferably, the concentration of nickel ions in the reaction solution is 8.33 mmol/L, the concentration of iron ions is 2.50 mmol/L, and the concentration of terephthalic acid is 4.17 mmol/L.

Preferably, the volume ratio of water to the organic solvent is 1-2:1. More preferably, the volume ratio of water to the organic solvent is 1:1.

Preferably, the reaction temperature is 150° C., and the reaction time is 3 h.

Preferably, the preparation method further comprises the steps of washing, centrifuging and drying the product obtained after the reaction. The solvent for washing is deionized water and ethanol. The rotation speed during the centrifugation is 8000-10000 rpm, and the centrifugation time is 3-5 min. The drying temperature is 50-60° C., and the drying time is 10-12 h. More preferably, the rotation speed during the centrifugation is 8000 rpm, the centrifugation time is 3 min, and the drying is performed in a blast drying oven at 60° C. for 12 h.

Another object of the present invention is to provide an ultra-thin Ni—Fe-MOF nanosheet prepared by the preparation method as described above. The nanosheet has a chemical formula $[Ni_2Fe(OH)_2(1,4-BDC)_2(H_2O)_4(SO_4)_{0.5}] \cdot nH_2O$, where Ni represents nickel ion, Fe represents iron ion, OH represents bridged hydroxyl ligand, 1,4-BDC represents deprotonated terephthalic acid ligand, the preceding $H_2O$ represents water molecules involved in coordination, the latter $H_2O$ represents free water molecules, and $SO_4$ represents sulfate ions.

Furthermore, the present invention also provides use of the ultra-thin Ni—Fe-MOF nanosheet as an electrocatalyst in catalyzing an oxygen evolution reaction (OER).

As compared with the prior art, the present invention has the following beneficial effects.

1. In the present invention, the target product can be obtained through solvothermal reaction in one step, the operation is simple, the reaction time is short, and the reaction can be completed in only a few hours.

2. In the present invention, a "bottom-up" wet chemical synthesis method is employed, and the obtained product has uniform morphology and high yield.

3. In the present invention, no surfactant is introduced for morphology control during the preparation process, so the product surface is neat and easy to be cleaned.

4. By means of the present invention, the large-scale synthesis of 2D ultra-thin MOF materials can be realized, and the target product can be collected at a gram level after a single-pass reaction at a laboratory scale.

5. The 2D ultra-thin MOF material prepared in the present invention exhibits excellent catalytic performance when used as an electrocatalyst to catalyze the OER reaction, where at a current density of 10 mA·cm$^{-2}$, the overpotential is only 221 mV, and the Tafel slope is as low as 56.0 mV·dec$^{-1}$, which are significantly better than those of commercial Ir/C materials.

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Example 1: Preparation of Ultra-Thin Ni—Fe-MOF Nanosheet

Solid nickel acetate tetrahydrate (24.8 mg, 0.1 mmol) and ferrous sulfate heptahydrate (7.38 mg, 0.03 mmol) were weighed and dissolved in deionized water (6 mL) to give a solution A. Terephthalic acid (8.3 mg) as an organic ligand was dissolved in DMAC (6 mL) to give a solution B. The solution B was slowly added to the solution A with stirring and mixed evenly. Then, the mixed solution was fed to a stainless steel reactor lined with polytetrafluoroethylene, sealed, and then reacted in an oven at 150° C. for 3 h. After the reaction, the reaction solution was naturally cooled to room temperature, washed with deionized water and ethanol, separated by centrifugation, and dried to obtain an ultra-thin Ni—Fe-MOF nanosheet as a yellow powder, which was designated as Ni—Fe-MOF NSs.

Figure 1:
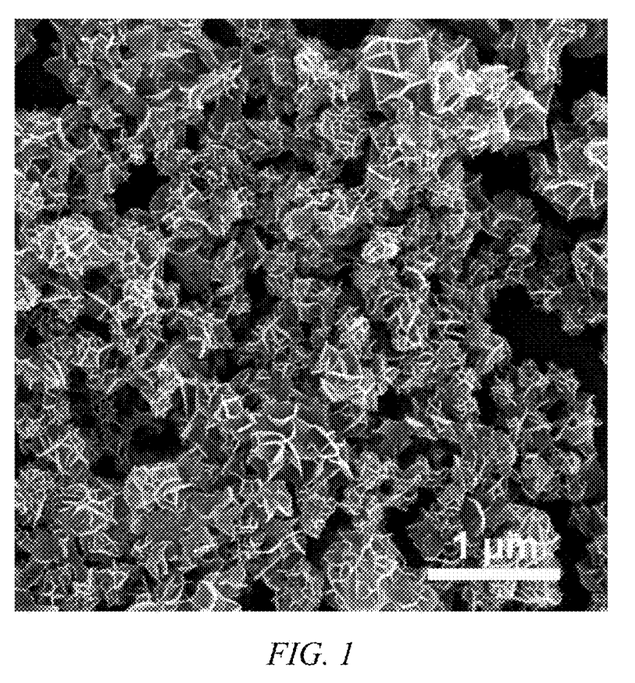
FIG. 1 is a scanning electron microscope (SEM) image of an ultra-thin Ni—Fe-MOF nanosheet.
Figure 2:
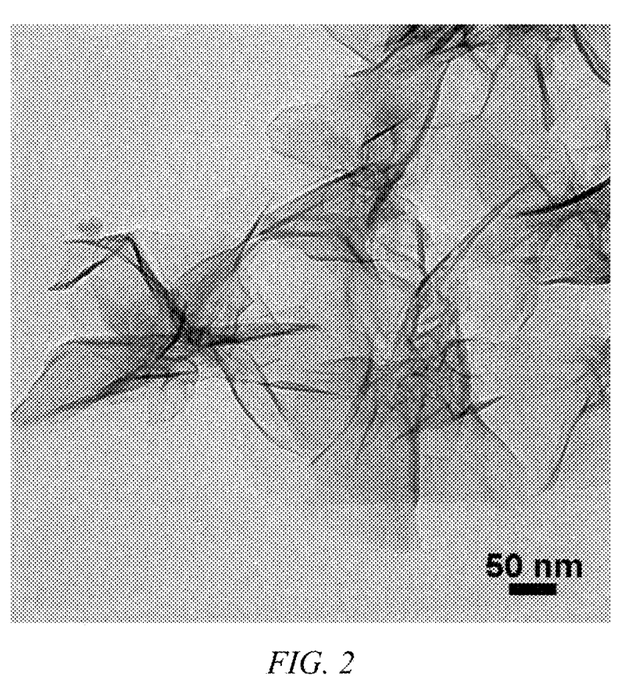
FIG. 2 is a transmission electron microscope (TEM) image of an ultra-thin Ni—Fe-MOF nanosheet.

As shown in FIGS. 1 and 2, the ultra-thin Ni—Fe-MOF nanosheet has a uniform morphology, high quality and yield.

Figure 3:
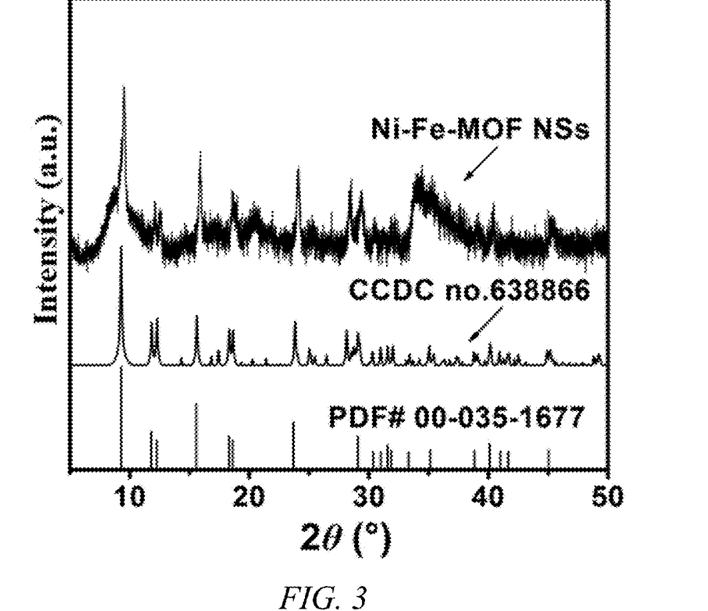
FIG. 3 is a powder X-ray diffraction (PXRD) pattern of an ultra-thin Ni—Fe-MOF nanosheet.

As shown in FIG. 3, the powder X-ray diffraction pattern (PXRD) of the ultra-thin Ni—Fe-MOF nanosheet is consistent with that of the simulated MOF material (CCDC No. 638866 and JCPDS No. 00-035-1677).

Figure 4:
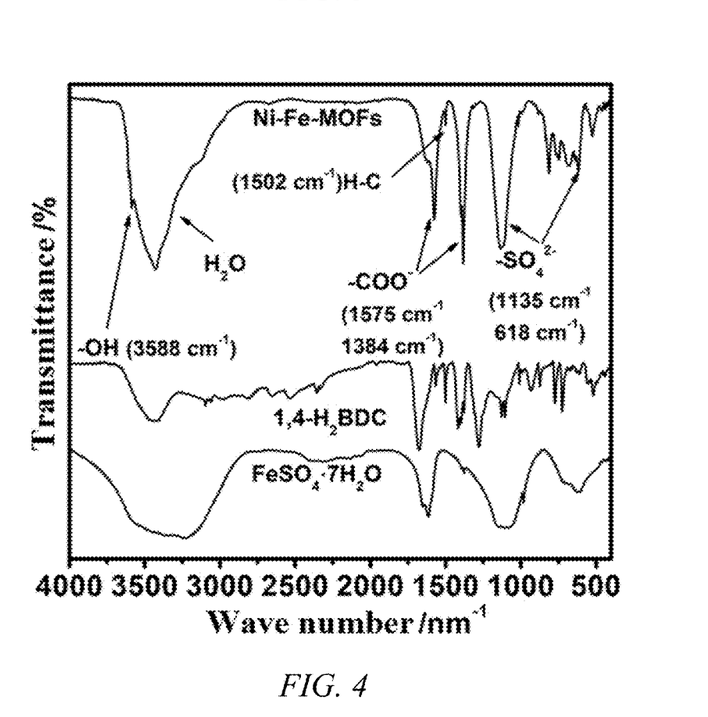
FIG. 4 is an infrared (IR) spectrum of an ultra-thin Ni—Fe-MOF nanosheet.

As shown in FIG. 4, the IR spectrum of the ultra-thin Ni—Fe-MOF nanosheet also confirms the presence of hydroxyl, terephthalate and sulfate in the synthesized ultra-thin Ni—Fe-MOF nanosheet.

Figure 5:
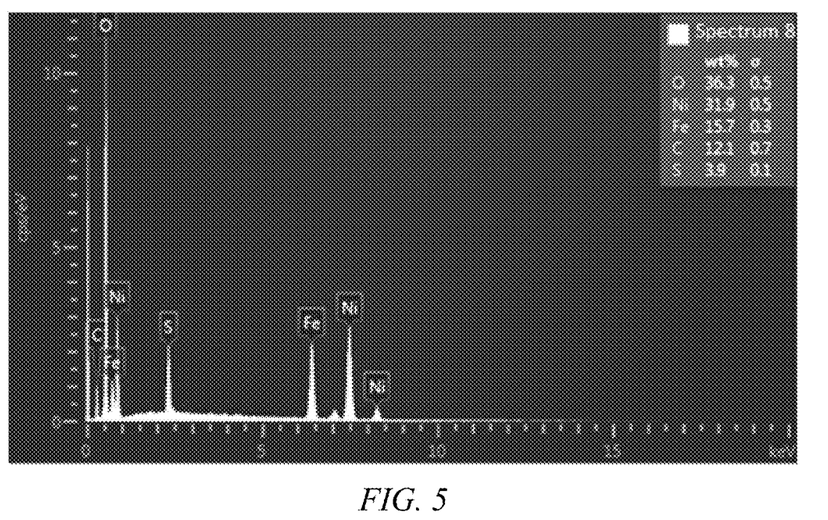
FIG. 5 is an energy dispersive X-ray (EDX) spectrum of an ultra-thin Ni—Fe-MOF nanosheet.
Figure 6:
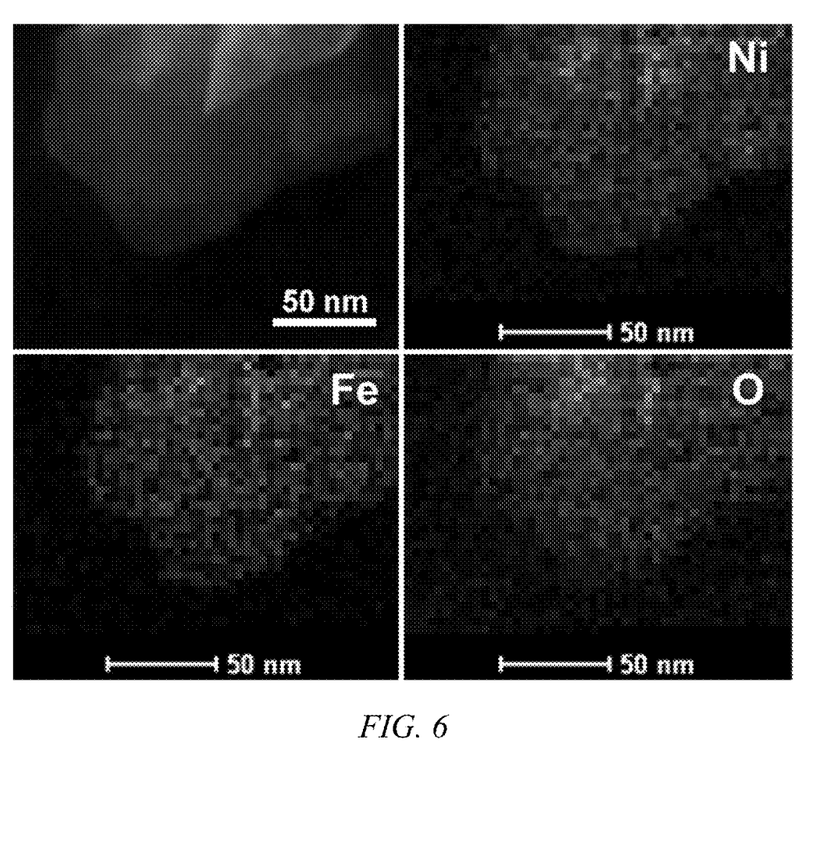
FIG. 6 is high-angle annular dark-field images of an ultra-thin Ni—Fe-MOF nanosheet showing corresponding element distribution.

As shown in FIGS. 5 and 6, the ultra-thin Ni—Fe-MOF nanosheet is composed of Ni, Fe, C, O and S elements, where each element is evenly distributed.

Figure 7:
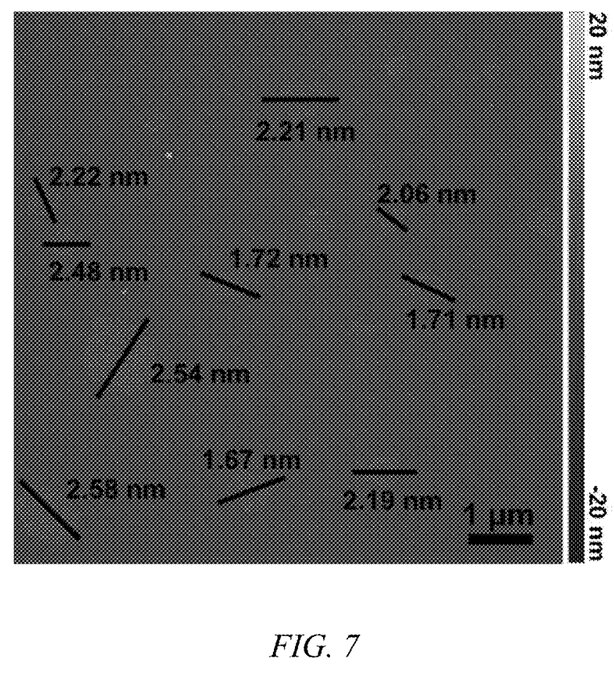
FIG. 7 is an atomic force microscope (AFM) image of an ultra-thin Ni—Fe-MOF nanosheet.

As shown in FIG. 7, the thickness of the ultra-thin Ni—Fe-MOF nanosheet is between 1.67 nm and 2.58 nm.

Figure 8:
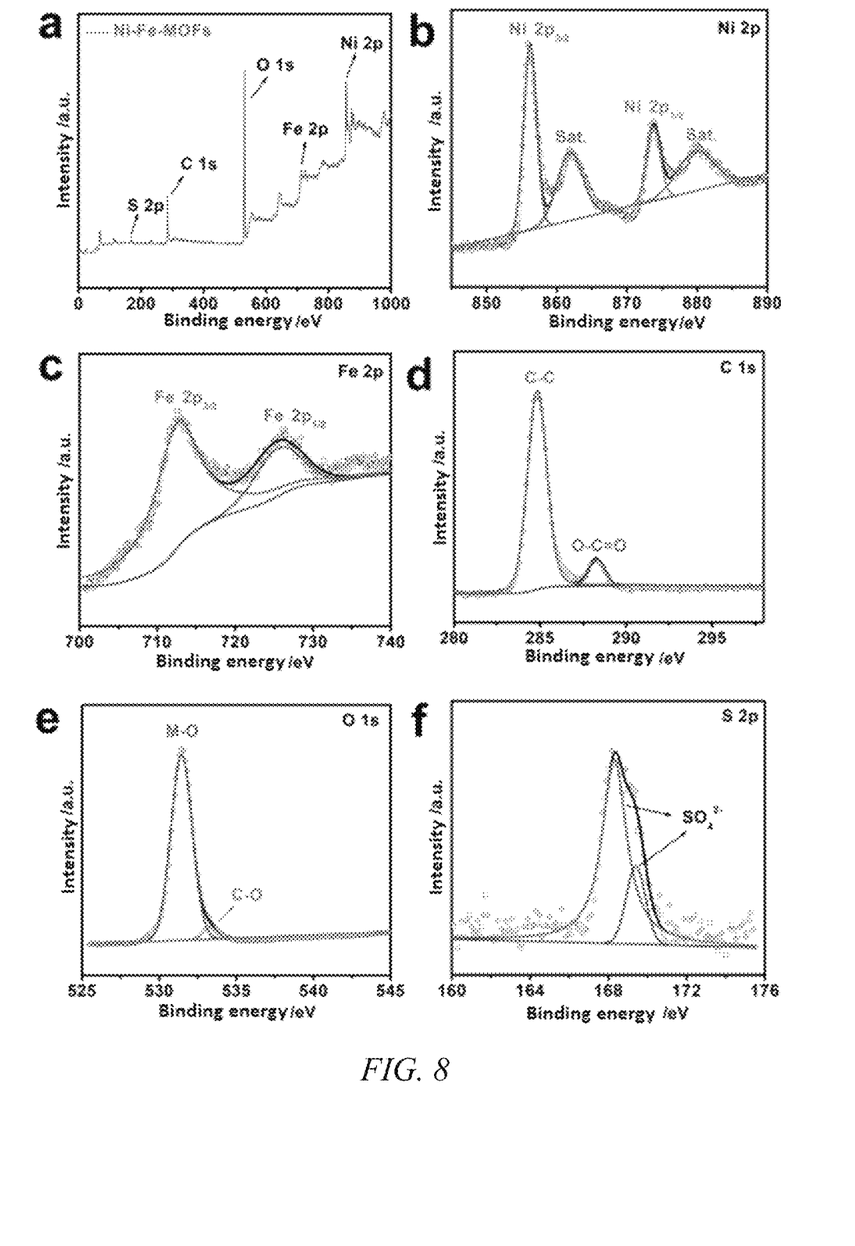
FIG. 8 is an X-ray photoelectron spectrum (XPS) of an ultra-thin Ni—Fe-MOF nanosheet.

As shown in FIG. 8, the X-ray photoelectron spectrum (XPS) of the ultra-thin Ni—Fe-MOF nanosheet shows that the valences of Ni, Fe and S are +2, +3 and +2, respectively.

Comparative Example 1: Preparation of Single Metal Ni-MOF Nanosheet

Single metal Ni-MOF nanosheet has a chemical formula of $[Ni_3(OH)_2(1,4-BDC)_2(H_2O)_4] \cdot 2H_2O$, where Ni represents nickel ion, OH represents bridged hydroxyl ligand, 1,4-BDC represents deprotonated terephthalic acid ligand, the preceding $H_2O$ represents water molecules involved in coordination, and the latter $H_2O$ represents free water molecules. The preparation process was as follows.

Solid nickel acetate tetrahydrate (24.8 mg, 0.1 mmol) was weighed and dissolved in deionized water (6 mL) to give a solution A. Terephthalic acid (8.3 mg) as an organic ligand was dissolved in DMAC (6 mL) to give a solution B. The solution B was slowly added to the solution A with stirring and mixed evenly. Then, the mixed solution was fed to a stainless steel reactor lined with polytetrafluoroethylene, sealed, and then reacted in an oven at 150° C. for 3 h. After the reaction, the reaction solution was naturally cooled to room temperature, washed with deionized water and ethanol, separated by centrifugation, and dried to obtain a single-metal Ni-MOF nanosheet as a light-blue powder.

Figure 9:
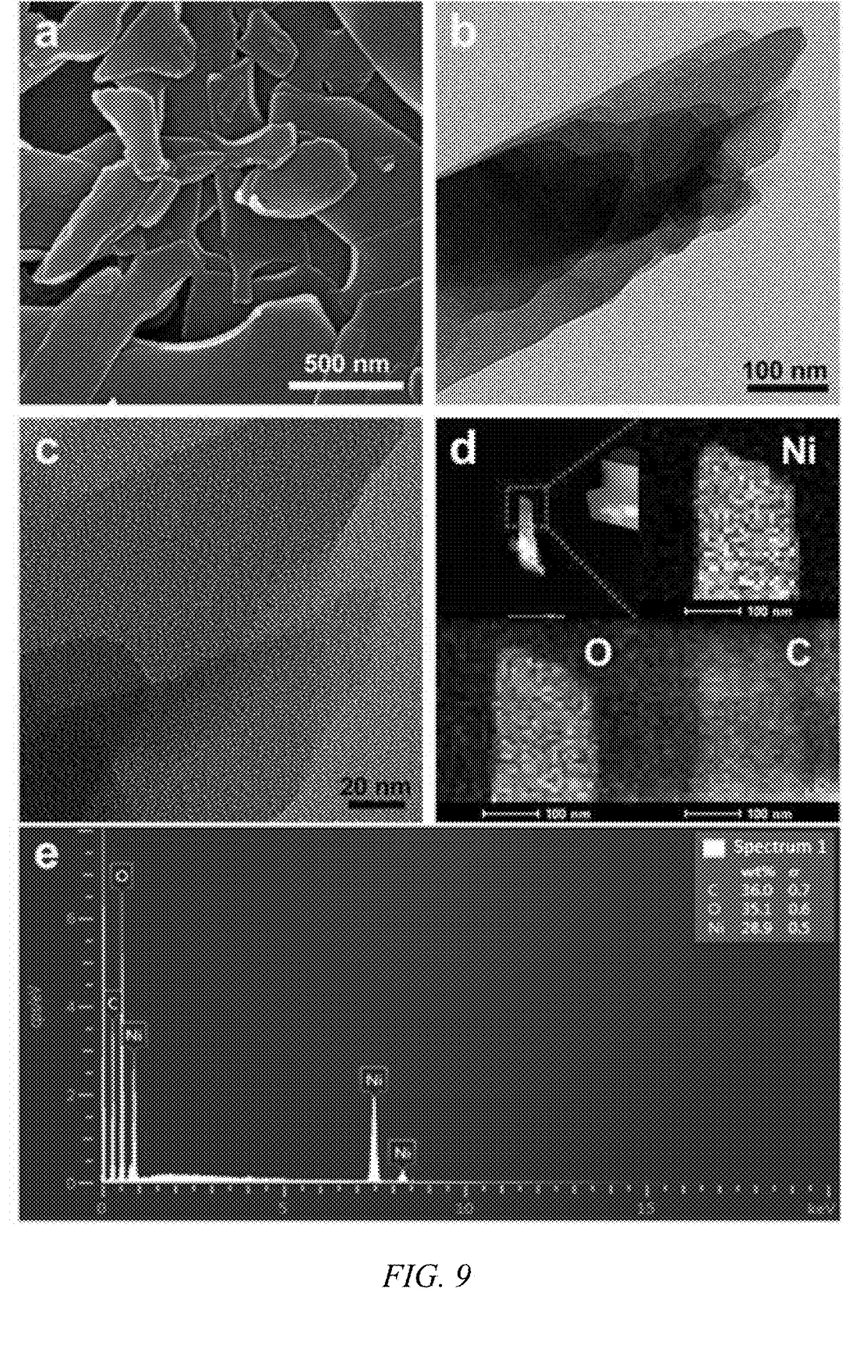
FIG. 9 shows an SEM image (a), TEM images (b and c), a high-angle annular dark-field image showing corresponding element distribution (d) and an EDX spectrum (e) of a Ni-MOF nanosheet.

As shown in FIG. 9, the Ni-MOF material has a two-dimensional flake morphology, and is mainly composed of Ni, C and O elements, where each element is uniformly distributed.

Figure 10:
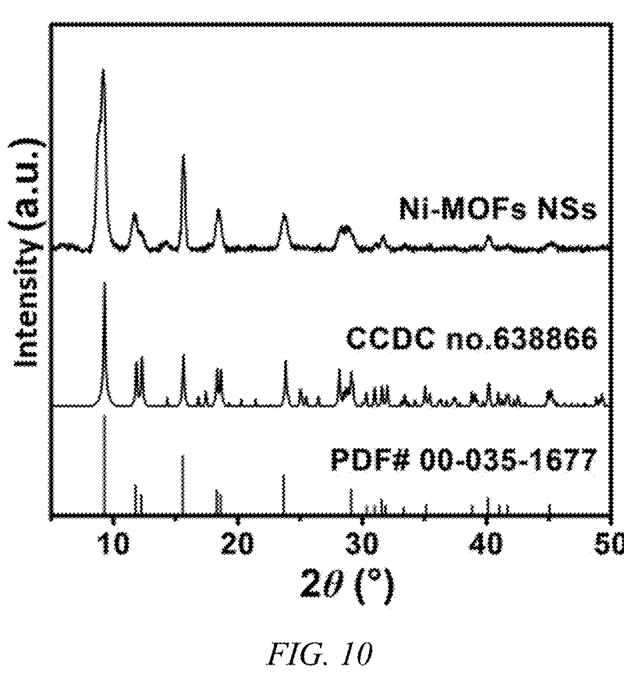
FIG. 10 is a PXRD pattern of a Ni-MOF nanosheet.

As shown in FIG. 10, the powder X-ray diffraction pattern (PXRD) of the Ni-MOF nanosheet is consistent with that of the simulated MOF material (CCDC No. 638866 and JCPDS No. 00-035-1677).

Figure 11:
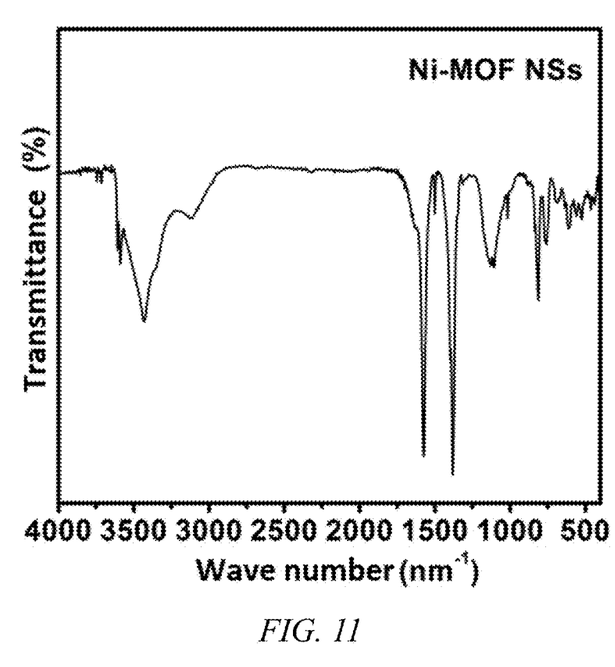
FIG. 11 is an IR spectrum of a Ni-MOF nanosheet.

As shown in FIG. 11, the IR spectrum of the Ni-MOF nanosheet also confirms the presence of hydroxyl and terephthalate.

Example 2: Mass Preparation of Ultra-Thin Ni—Fe-MOF Nanosheet

Figure 12:
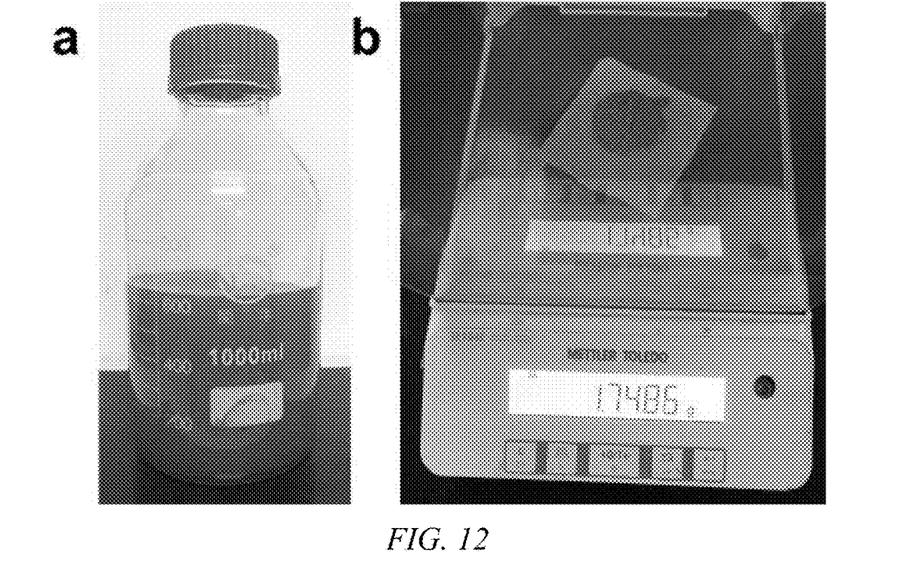
FIG. 12 are photographs showing the dispersion and powder of an ultra-thin Ni—Fe-MOF nanosheet prepared by the expanded reaction.

Solid nickel acetate tetrahydrate (2.48 g, 10 mmol) and ferrous sulfate heptahydrate (0.738 g, 3 mmol) were weighed and dissolved in deionized water (300 mL) to give a solution A. Terephthalic acid (0.830 g, 5 mmol) as an organic ligand was dissolved in DMAC (300 mL) to give a solution B. The solution B was slowly added to the solution A with stirring and mixed evenly. Then, the mixed solution was fed to a 1000 mL thick-wall reaction flask, sealed, and then reacted in an oven at 150° C. for 3 h. After the reaction, the reaction solution was naturally cooled to room temperature, washed with deionized water and ethanol, separated by centrifugation, and dried to obtain an ultra-thin Ni—Fe-MOF nanosheet as a yellow powder (1.7486 g), as shown in FIG. 12.

Figure 13:
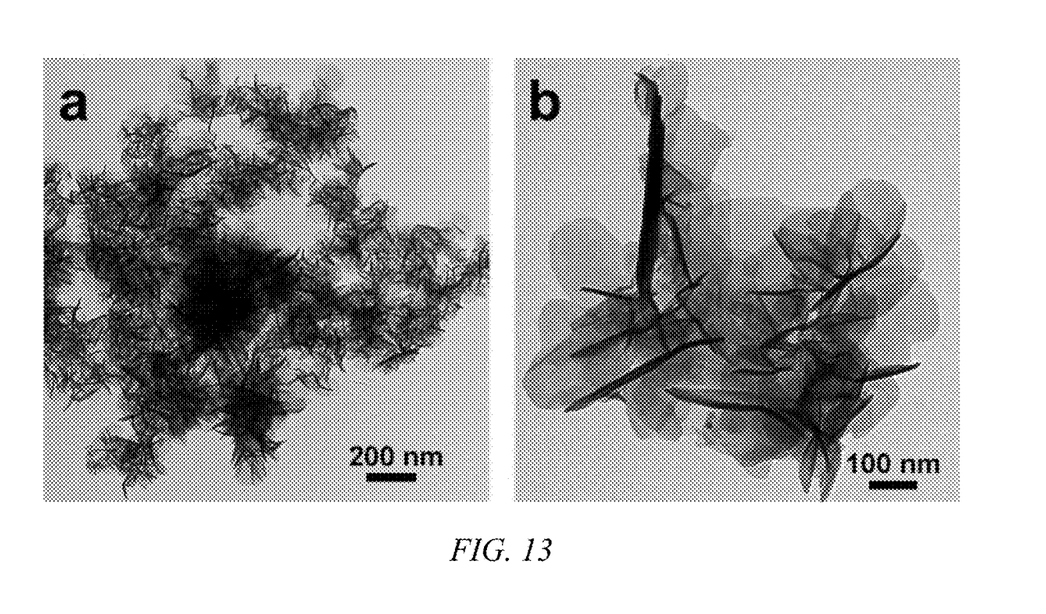
FIG. 13 is a TEM image of an ultra-thin Ni—Fe-MOF nanosheet prepared by the expanded reaction.

As shown in FIG. 13, the mass-synthesized ultra-thin Ni—Fe-MOF nanosheet has a uniform morphology, high quality and yield.

Figure 14:
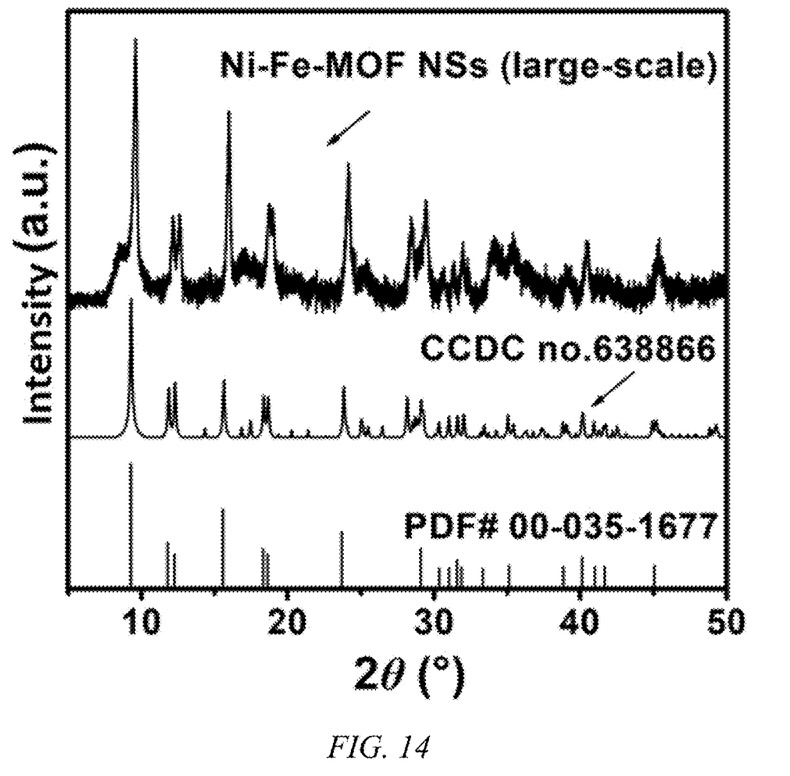
FIG. 14 is an XRD image of an ultra-thin Ni—Fe-MOF nanosheet prepared by the expanded reaction.

As shown in FIG. 14, the powder X-ray diffraction pattern (PXRD) of the mass-synthesized ultra-thin Ni—Fe-MOF nanosheet is consistent with that of the simulated MOF material (CCDC No. 638866 and JCPDS No. 00-035-1677).

Example 3: Preparation of Electrocatalyst

Ultra-thin Ni—Fe-MOF nanosheet solid powder (2.5 mg) and commercial carbon black (2.5 mg) were weighed and mixed. Isopropanol (970 µL) and 5 wt. % Nafion solution (30 µL) were added, and ultrasonicated for 1 h to disperse the solid evenly to form an ink-like solution. The solution (20 µL) was dripped onto a polished surface of a glassy carbon electrode in batches, and let it dry naturally before use.

As a comparison, Ni-MOF solid powder (2.5 mg) and commercial carbon black (2.5 mg) were weighed and mixed. Isopropanol (970 µL) and 5 wt. % Nafion solution (30 µL) were added, and ultrasonicated for 1 h to disperse the solid evenly to form an ink-like solution. The solution (20 µL) was dripped onto a polished surface of a glassy carbon electrode in batches, and let it dry naturally before use.

As a comparison, commercial Ir/C (5 wt. % Ir) (5.0 mg) was weighed. Isopropanol (970 µL) and 5 wt % Nafion solution (30 µL) were added, and ultrasonicated for 1 h to disperse the solid evenly to form an ink-like solution. The solution (20 µL) was dripped onto a polished surface of a glassy carbon electrode in batches, and let it dry naturally before use.

Example 4: OER Performance Test

The entire electrocatalytic test was carried out with a standard three-electrode system, where the working electrode was a glassy carbon electrode coated with the catalyst, the reference electrode was an Ag/AgCl (saturated KCl solution) electrode, and the auxiliary electrode was a platinum wire electrode. The electrolyte solution used for linear sweep voltammetry (LSV) test was 1 M KOH solution saturated with $O_2$, the sweep range of the potential was 0-0.8 V, the sweep speed was 5 mV/s, and the test data were all compensated by iR.

Figure 15:
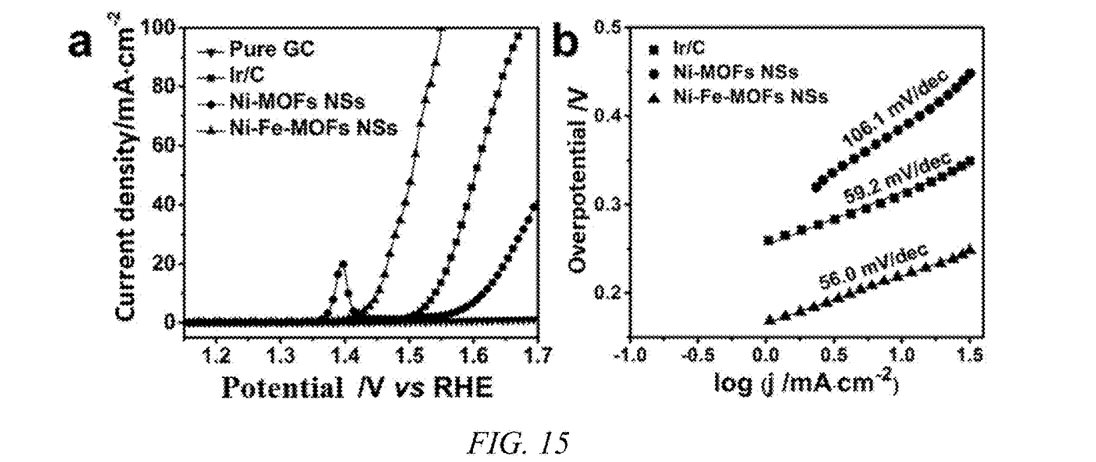
FIG. 15 shows (a) the polarization curve and (b) the Tafel slope in an OER reaction catalyzed by an ultra-thin Ni—Fe-MOF nanosheet.
Figure 16:
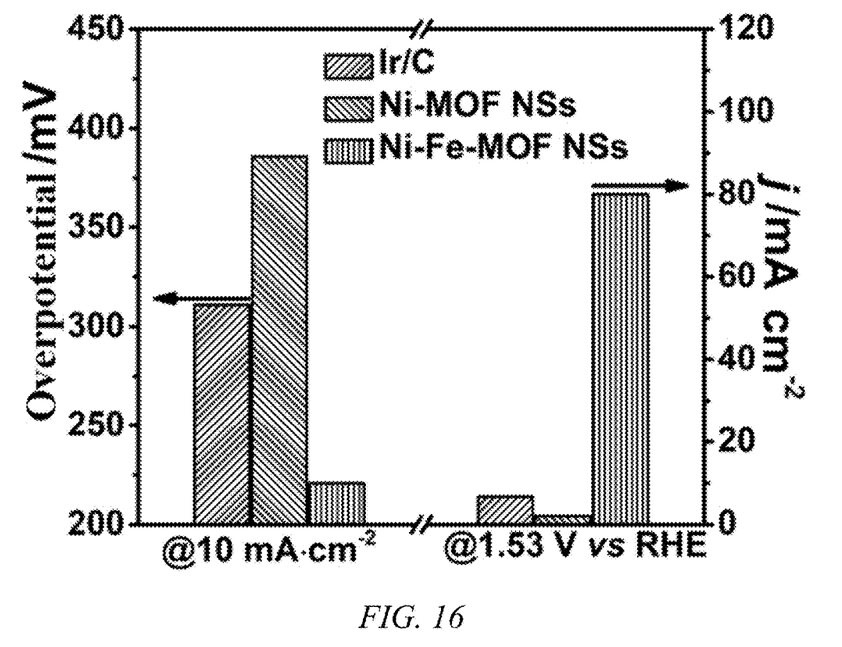
FIG. 16 is a bar graph showing the overpotential and current density in an OER reaction catalyzed by an ultra-thin Ni—Fe-MOF nanosheet.

As shown in FIGS. 15 and 16, compared to the single metal Ni-MOF nanosheet and the commercial Ir/C, the ultra-thin Ni—Fe-MOF nanosheet exhibits excellent electrocatalytic performance in the OER reaction, the overpotential value is only 221 mV at a current density of 10 mA·cm$^{-2}$, and the Tafel slope is as low as 56.0 mV·dec$^{-1}$.

Example 5: Electrocatalytic Stability Test

In a standard three-electrode system, the reference electrode, the auxiliary electrode, and the glassy carbon electrode coated with the catalyst were inserted into a 1 M KOH solution saturated with $O_2$ to perform a chronopotentiometric test. The current value of the test was 2 mA.

Figure 17:
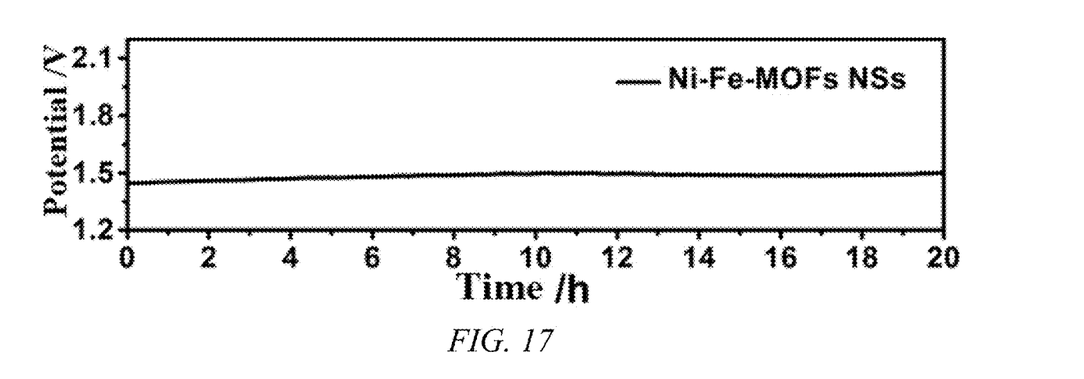
FIG. 17 shows the chronopotentiometric graph in an OER reaction catalyzed by an ultra-thin Ni—Fe-MOF nanosheet.

As shown in FIG. 17, the ultra-thin Ni—Fe-MOF nanosheet shows excellent stability. In the constant-current chronopotentiometric test, the electrocatalytic performance has no significant decrease after 20 h.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention. The scope of the present invention is defined by the appended claims.

What is claimed is:

1. A method for preparing an Ni—Fe-MOF nanosheet, comprising steps of:
    dissolving an organic ligand in an organic solvent to get a mixed solution;
    dripping the mixed solution to an aqueous solution containing a nickel salt and an iron salt with stirring; and
    mixing uniformly and reacting at 140-160° C. for 3-6 hours, to obtain the Ni—Fe-MOF nanosheet;
    wherein the organic ligand is terephthalic acid and/or disodium terephthalate, and the organic solvent is N,N-dimethylacetamide and/or N,N-dimethyl formamide,
    wherein a volume ratio of water of the aqueous solution to the organic solvent is 1-2:1, and wherein the concentration of nickel ions in the reaction solution is 8.33 mmol/L, the concentration of iron ions is 2.50 mmol/L, and the concentration of terephthalic acid is 4.17 mmol/L.

2. The method for preparing an Ni—Fe-MOF nanosheet according to claim 1, wherein the nickel salt is nickel acetate tetrahydrate and/or nickel nitrate hexahydrate, and the iron salt is ferrous sulfate heptahydrate.

3. The method for preparing an Ni—Fe-MOF nanosheet according to claim 1, further comprises the steps of washing, centrifuging and drying the obtained product, wherein the solvent for washing is deionized water and ethanol, the rotation speed during the centrifugation is 8000-10000 rpm, the centrifugation time is 3-5 minutes, the drying temperature is 50-60° C., and the drying time is 10-12 hours.

* * * * *